Figure 1:
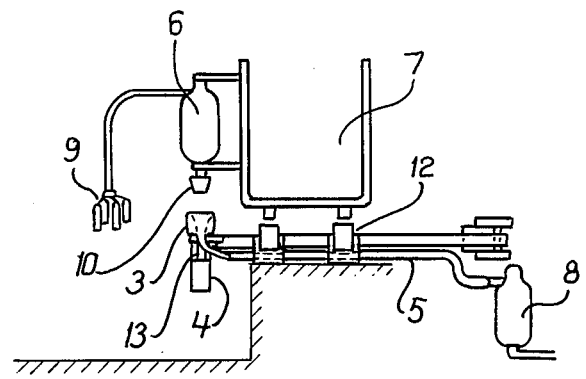

United States Patent
Andersson

[11] 3,999,517
[45] Dec. 28, 1976

[54] MILKING INSTALLATION
[75] Inventor: Tage Signer Andersson, Bjorkvik, Sweden
[73] Assignee: Alfa-Laval AB, Tumba, Sweden
[22] Filed: Sept. 8, 1975
[21] Appl. No.: 611,011
[30] Foreign Application Priority Data
   Sept. 13, 1974 Sweden .............................. 7411553
[52] U.S. Cl. .......................................... 119/14.04
[51] Int. Cl.² .......................................... A01J 9/00
[58] Field of Search .......... 119/14.04, 14.11, 14.08
[56] References Cited

UNITED STATES PATENTS

| | | | |
|---|---|---|---|
| 1,787,152 | 12/1930 | Hapgood | 119/14.04 |
| 3,699,923 | 10/1972 | Strom | 119/14.04 |

Primary Examiner—Hugh R. Chamblee
Attorney, Agent, or Firm—Cyrus S. Hapgood

[57] ABSTRACT

A milking installation comprises an annular platform divided into separate milking stalls, each for one cow and provided with a milking unit hermetically connected to its milk receiver, and means for rotating the annular platform so that the stalls successively pass a milk collecting station. The latter includes a flexible milk tube carried by an arm of variable length which is pivoted at one end, the free end of the arm being provided with a coupling member connected to the flexible tube and movable vertically to connect hermetically with said milk receiver. The flexible tube moves along with the milk receiver and returns to its starting position after being disconnected from the receiver by the coupling member.

3 Claims, 2 Drawing Figures

MILKING INSTALLATION

The present invention relates to milking installations comprising an annular platform, horizontally rotatable and divided up into separating milking stalls, each of them for one cow and provided with a milking unit, hermetically connected to its receiving vessel for the milk, means for rotating the annular platform during the milking operation to make the milking stalls successively pass a stationary milk collection installation, and comprising a connection to the collection installation, the said connection being arranged to connect hermetically to the said receiving vessel and to move along with the latter, and being arranged to be returned to its starting position after having been disconnected. The installation according to the invention is especially characterized by the fact that the said connection comprises a flexible tube, carried by an arm, whose length is flexible, the said arm being pivoted at one of its ends, the said flexible tube being connected to vertically movable coupling means, provided at the free end of the said arm.

In all types of machine milking installations available, it is mandatory that the milk be conveyed in a closed system from the cow udder to the cooler and the collection tank. Normally, a machine milking installation comprises a receiving vessel for the milk at each milking stall. As regards installations comprising a rotatable annular platform, the milk is generally conveyed from the receiving vessels to a central collection tank. In such installations the receiving vessels are permanently connected to an annular pipe line, which is connected to a horizontally turnable pipe joint, provided in the fixed pivot of the platform, through which pipe joint the milk is conveyed via a permanent pipe line to the cooler and the collection tank. This arrangement suffers from certain drawbacks. Thus the central collection of milk brings with it some difficulties in separating inferior milk, if needed. Furthermore, an extensive pipe system, which is hard to clean, is required. There is a particular risk that the indispensable rotatable pipe joint will give rise to problems as to tightness and cleaning.

As regards milking installations, comprising milking stalls, movable along a path, including at least one part forming an arc of a circle, means for individual conveyance of the milk to a collection tank may be used. Such means is disclosed in the Swedish Patent Specification No. 342 541, and includes a pipe branch, pivoted about the centre of the said arctuate path and connected to a collection tank. This connection may be permanent, in which case the collection tank will rotate with the pipe branch, or it may consist of a rotatable pipe joint. At the free end of the pipe there is provided means for hermetically coupling the pipe branch to an outlet of each receiving vessel. The relative distance between the fixed pivot of the pipe branch and the outlets of the receiving vessels will remain unchanged during the milk conveyance operation, as the milking stalls move along an arctuate path at least during the milk conveyance operation. Obviously, one provision for the use of an arrangement including a pipe branch rotatable about a collection tank is that the latter is positioned in the centre of the arctuate path, which brings with it certain drawbacks from a practical point of view. As has already been mentioned, the use of rotatable joints in milk pipe lines is disadvantageous.

In the milking installation according to the invention, comprising means for individual conveyance of milk from the receiving vessels, the need for a rotatable pipe joint is eliminated, and the collection tank may be positioned at a distance from the centre of the rotatable platform. The milk is conveyed in the closed system in the common way by vacuum. A flexible tube, at one end directly connected to the cooler and the collection tank, and at the other end connected to an internally conical coupling member, is provided for the conveyance of the milk from the receiving vessels. The flexible tube is carried by an arm, the length of which is variable, and which is horizontally pivoted about a bracket, which is fixed not too far from the collection installation, including the cooler and the collection tank. The said internally conical coupling member is provided at the free end of the arm and is arranged to be vertically movable by the aid of a linear servo-motor, by means of which it is connectable to an externally conical member, which is provided at the lower part of each receiving vessel. The arm, the length of which is variable, is of such dimensions that, being located in the starting position, it will place the internally conical coupling member below a passing receiving vessel, whereupon it is brought into contact with the said externally conical member by the said linear servo-motor. Then the receiving vessel will move along with the annular platform, at which movement the distance between the receiving vessel and the said bracket will change to a final position, at which the internally conical coupling member will be released from its externally conical counterpart.

Figure 2:
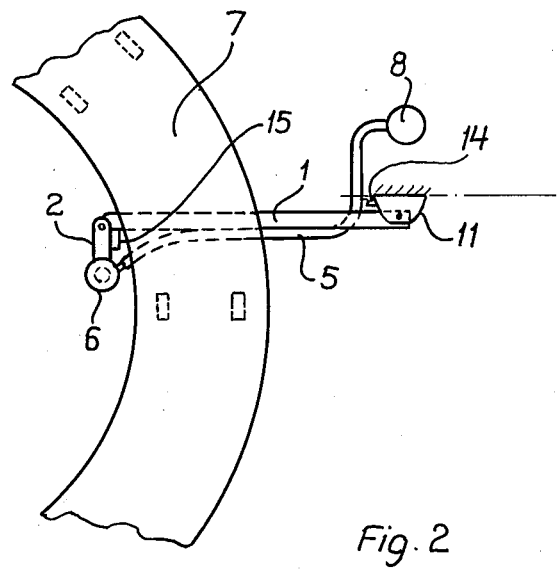

One embodiment of the invention will now be disclosed more fully, reference being made to the accompanying drawing, in which FIG. 1 schematically shows an elevational view of certain details of a milking installation according to the invention, and FIG. 2 shows a plan view of the same installation, from which some details have been removed.

An annular platform 7 rests on rollers 12, which are mounted in bearings in supports, fixed on a foundation. The platform 7 is rotatable horizontally by means which are not shown. Along its inner edge, the platform carries a row of receiving vessels 6, only one of which is shown in the drawing. Each receiving vessel is connected to a milking unit 9, and at the lower part there is provided coupling means 10, including a conical joint. Not too far from the collection installation 8, including among other things a cooler, which is not shown, and a collection tank, a bracket 11 is fixed on the foundation. About this bracket a link 1 is horizontally pivoted. At its free end, the link 1 is connected to a shorter link 2, which is also horizontally rotatable relative to the link 1. At the bracket 11 there is provided a stop 14, which limits the clockwise movement of the link 1, according to FIG. 2. A first screw spring, which is not shown, keeps the link 1 pressed against the stop 14 in a starting position. It might be appropriate to arrange a damping cylinder on the stop to damp the impact of the link 1 against the stop 14 in its clockwise movement according to FIG. 2. The turning of the shorter link 2 counter-clockwise to the link 1 according to FIG. 2 is limited by a stop 15, consisting of a short arm, which is arranged at right angles to link 1 at the end of the latter. In a starting position, link 2 is kept against stop 15 by a second screw spring, which is not shown. At the free end of link 2, there is provided a pneumatic cylinder 4, the piston 13 of which is directed vertically upwards, carrying an internally conical member 3, which can be connected hermetically to the externally conical member 10, the internally conical member being connected to a flexible tube 5, directly connected to a cooler and a collection tank at the collection installation 8.

A milk collection operation goes on in the following way:

As a receiving vessel 6, moving along its arcuate path, locates its coupling member 10 exactly above the coupling member 3, this is caused to rise by the pneumatic cylinder 4, till the coupling member 3 has been hermetically connected to the coupling means 10.

The receiving vessel will move further on, bringing the arm 1, 2 and the flexible tube along. The arcuate path will make the distance between the receiving vessel 6 and the bracket 11 grow, which in turn makes the links 1 and 2 turn mutually, the arm which they constitute thus extending. The flexible tube 5 is long enough to permit this movement. During the movement, the milk is conveyed to the collection tank. In a position where the links 1 and 2 form an obtuse angle or lie on a straight line, the coupling member 3 is released by the pneumatic cylinder 4 and the link 2 turns by the aid of the first mentioned spring to a position where it rests against the stop 15, at right angles to the link 1, and this link returns to a starting position, resting against the stop 14, by the aid of the last mentioned spring. Thus a new conveyance operation can start again.

I claim:

1. A milking installation comprising an annular platform rotatable horizontally and divided into separate milking stalls, each stall being for one cow and including a milking unit and a milk receiver hermetically connected to the milking unit, means for rotating the annular platform, and a milk collecting station which is passed successively by the milking stalls as the platform is rotated, said station including an arm pivoted at one end for swinging horizontally about said end, the arm having an opposite free end and being of variable length between its said ends, a vertically movable coupling member carried by said free end of the arm, a flexible milk-conveying tube connected to the coupling member and movable with said arm, and means for moving the coupling member vertically in one direction on said arm to couple the flexible tube hermetically to a said milk receiver and to cause the arm to swing horizontally from a starting position to accommodate movement of the coupling member with said receiver, said means being operable to move the coupling member vertically in the opposite direction to uncouple the flexible tube from said receiver and allow return of the arm to its said starting position.

2. The milking installation of claim 1, in which said arm is formed by two links rotatable relative to each other in a horizontal plane.

3. The milking installation of claim 1, in which said means comprise a linear servo-motor.

* * * * *